No. 885,397. PATENTED APR. 21, 1908.
O. L. STUMP, J. REIDENBAUGH & E. D. PACKARD.
WATER PURIFYING APPARATUS.
APPLICATION FILED JUNE 22, 1906.
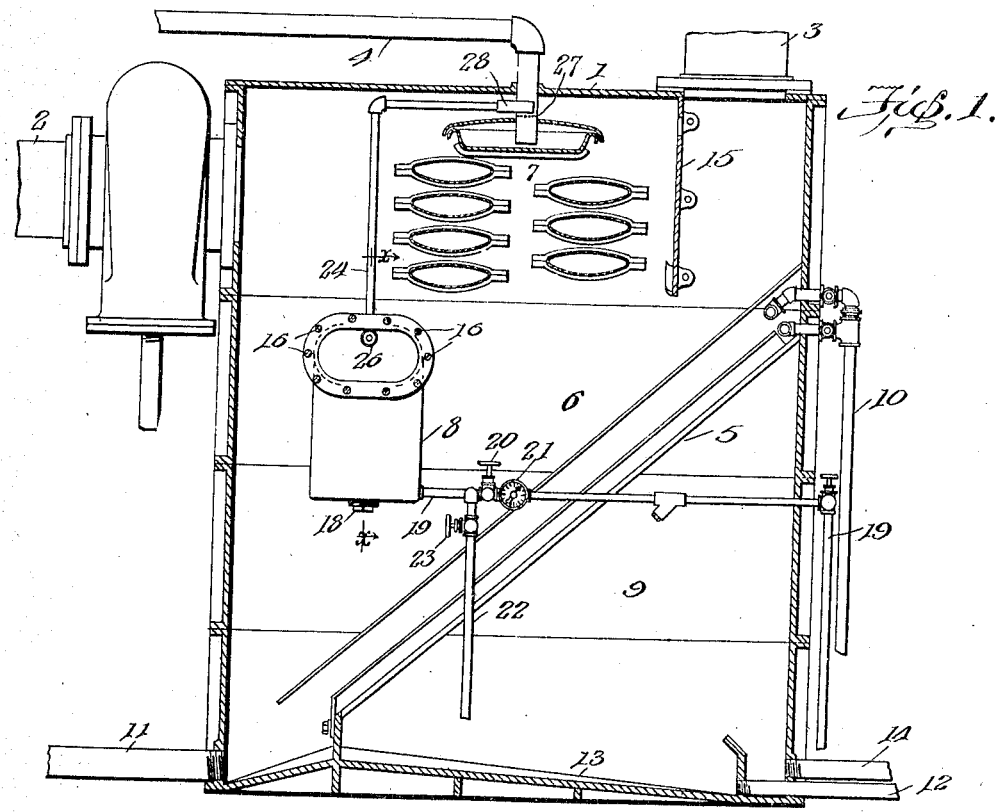
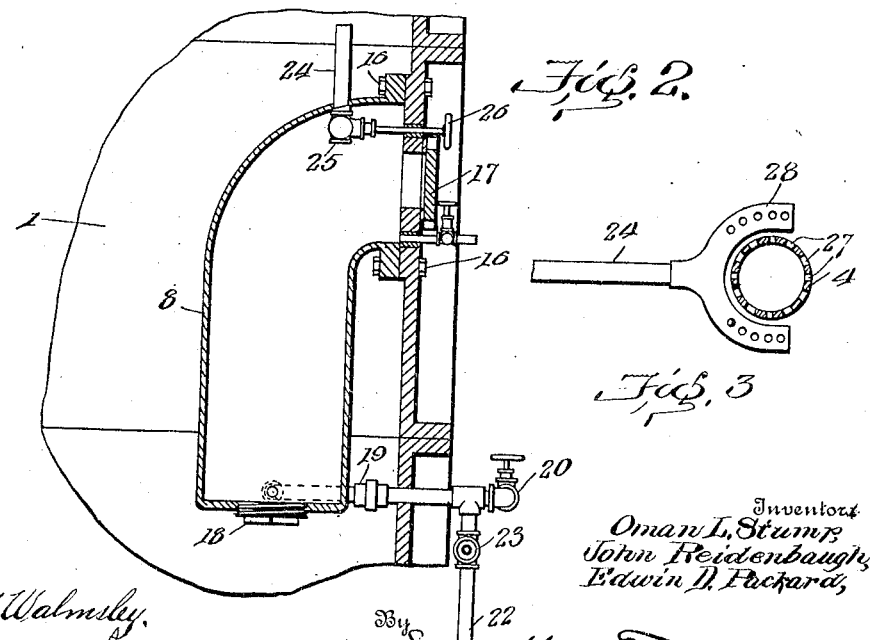

UNITED STATES PATENT OFFICE.

OMAN L. STUMP, JOHN REIDENBAUGH, AND EDWIN D. PACKARD, OF MARION, OHIO, ASSIGNORS TO THE MARION INCLINE FILTER AND HEATER COMPANY, OF MARION, OHIO, A CORPORATION OF OHIO.

WATER-PURIFYING APPARATUS.

No. 885,397.

Specification of Letters Patent.

Patented April 21, 1908.

Application filed June 22, 1906. Serial No. 322,911.

*To all whom it may concern:*

Be it known that we, OMAN L. STUMP, JOHN REIDENBAUGH, and EDWIN D. PACKARD, citizens of the United States, residing at Marion, in the county of Marion and State of Ohio, have invented certain new and useful Improvements in Water-Purifying Apparatus, of which the following is a specification, reference being had therein to the accompanying drawings.

This invention relates to improvements in water purifying apparatus, and the particular feature of the invention comprises an apparatus for introducing into the water the re-agent or chemical employed to effect chemical action on the water, to aid in the collection of impurities contained therein. Heretofore this re-agent, usually soda ash, has been contained in a tank placed wholly exterior to the purifying apparatus and a solution of the re-agent was carried into the apparatus by means of a system of piping. This has involved two essential difficulties. The first was the formation of incrustation in the pipe for conveying the solution from the tank to the purifying apparatus. This difficulty has led to various inventions or efforts to prevent this incrustation. The second difficulty has been to introduce the solution into the purifying apparatus without suffering back pressure or back action, produced by the pressure of the cold water supply. To overcome this difficulty resort has been had to efforts to find a place in the cold water pipe, or in the purifying apparatus near the pipe, where the back pressure of the feed water would not oppose the introduction of the solution into the purifying apparatus. Thus these several difficulties have led to expensive and cumbersome methods for overcoming, or attempting to overcome, them.

By our invention we entirely avoid all such difficulties and entirely eliminate all resort to devices and means for counteracting or overcoming such difficulties.

In our invention we incorporate or locate in the purifying apparatus the re-agent tank or receptacle. By this arrangement we eliminate at once all the difficulties above referred to and all the means for overcoming them. And we also are enabled to utilize the heat of the heating medium, usually exhaust steam, in the purifying apparatus to heat the re-agent solution. We discharge the re-agent directly from the inner-located re-agent tank into the purifying apparatus, and by preference we conduct the re-agent by a pipe in the apparatus from the tank to the point where the water is introduced to the purifying pan, at which point we spray the incoming cold water and spray the re-agent solution, and cause their thorough intermixing. The re-agent solution being already warm or hot, aids to raise the temperature of the incoming water, and by this contained heat also more rapidly acts upon the incoming water to cause the contained impurities to more hastily collect.

In the accompanying drawing, Figure 1 is a sectional view of a purifying apparatus used to purify feed water for steam boilers, being preferably of the type, in respect to the filtering means, embodied in Letters Patent issued to one of us, O. L. Stump, Jan. 23rd, 1906, for feed water heaters, No. 810,441, the drawing illustrating our invention in connection therewith; Fig. 2, a sectional view on the line *x x* of Fig. 1, looking in the direction of the arrows, and showing the re-agent tank applied within the purifying apparatus; and Fig. 3, an inverted plan and sectional view of the chemical solution pipe and the cold water supply pipe, showing the perforations therein.

A suitable water purifying apparatus, such as that referred to above, is shown at 1, having an exhaust steam inlet 2, and an exhaust steam outlet 3, a cold or feed water inlet pipe 4, with a filtering bed 5 dividing the purifier into a compartment 6, for the trays or pans, generally indicated at 7, for heating the water and precipitating its lime and other impurities, and for the chemical tank 8, and into a lower compartment 9 for the filtered water. A pipe 10 is utilized to conduct water to wash the filter bed; a pipe 11 to draw off the collected impurities and sediment which gather in the lower part of the compartment 6, a pipe 12 to draw off the sediment, if any, from the bottom 13 of the filtered water compartment, and a pipe 14 to draw off the filtered water and conduct it thence to the boiler feed water pump. A baffle wall 15 may also be used to confine the steam about the purifying pans 7. These pans are preferably of the type and construction set forth in an application filed, even date herewith, Ser. No. 322,898, for improvements in water purifying apparatus, by one of us, namely, E. D.

Packard, but, of course, the invention now being described is not confined to use in connection with any particular type of purifying pans or any particular style or type of water purifying apparatus.

Referring now to the construction in which is embodied our invention, it will be seen that at 8 is designated a tank or vessel constituting a third compartment in the purifying apparatus 1. This tank is secured, preferably by bolts, as shown at 16, to one of the side walls of the purifier. A removable door 17 gives access to the interior of the tank for charging the chemical, say soda ash, the solution of which is to be utilized as the re-agent to produce the chemical action on the water to cause its impurities to collect. The bottom of the tank is provided with a removable screw plug 18, which constitutes one mode of permitting the tank to be cleaned out. In the lower part of the tank is introduced a feed water pipe 19 having a cock 20 by which it may be opened and closed, and a gage 21 to indicate the speed or rapidity with which the water is being fed into the tank. This pipe extends alongside of the purifier until it gets opposite the chemical tank, where it turns and goes through the wall of the purifier and enters the chemical tank, as shown particularly in Fig. 2. In this manner the chemical tank is charged with water to mix with the chemical or soda ash to produce the necessary solution. A drain pipe 22, controlled by a cock 23, branches from the feed pipe 19, between the tank and the cock 20, so that on closing the cock 20 and opening the cock 23, the tank may be drained.

A solution pipe 24, controlled by a cock 25, whose stem and hand wheel 26 are accessible outside of the purifier, extends from the chemical tank to the point where the solution is to be introduced into the water in the purifier. By preference this point is at the cold water feed pipe just inside of the purifier, where such pipe has perforations 27 through which the water sprays, while the pipe 24 has a nozzle 28, also perforated, to spray the solution. Thus the solution and the incoming water are intimately mixed, and this at a time before such water is conducted over the purifying pans. This place of intermixture is not vital, but is preferred.

Thus it will be seen with our apparatus the chemical tank or receptacle and the means for conveying the solution therefrom to the point of introduction into the water under purification are wholly within the purifying apparatus; that the structure is no larger for the purifying apparatus plus the chemical appliances than such apparatus is alone, thus effecting a saving in space which in some locations is very material; that this location of the chemical appliances enables us to utilize the heat or steam in the purifier to heat the solution and make it more effective in its action on and in mixing with the water; that there is no need of any means for preventing incrustation in any part of the chemical apparatus because under the conditions of its use as applied and located by us no incrustation can form; and that all difficulty in the way of back action by the pressure of the feed water acting to prevent the introduction of the solution is eliminated.

Having thus fully described our invention, what we claim as new and desire to secure by Letters Patent, is:—

1. In a water purifying apparatus, the combination, with a purifier proper, of chemical appliances located therein and consisting of a tank or receptacle for containing a reagent, water supply means discharging into said tank or receptacle and discharge means therefrom to introduce the solution produced by the water acting on the reagent into the water to be purified.

2. In a water purifying apparatus, the combination, with a purifier proper, of chemical appliances consisting of a tank or receptacle mounted therein, a water supply pipe leading thereto and a solution conveying pipe extending therefrom and adapted to discharge a solution into the water to be purified.

3. In a water purifying apparatus, the combination, with a purifier proper having a series of purifying pans and filtering appliances, of chemical appliances comprising a tank or receptacle located inside of the filter proper, a water pipe leading thereto and a solution discharge pipe leading therefrom to discharge the chemical into the water in advance of the purifying pans.

In testimony whereof we affix our signatures in presence of two witnesses.

OMAN L. STUMP.
JOHN REIDENBAUGH.
EDWIN D. PACKARD.

Witnesses:
CARL T. BAUMAN,
ROBERT G. LUCAS.